J. P. HANSEN.
PACKING OF PHOTOGRAPHIC RAW FILMS.
APPLICATION FILED DEC. 10, 1918.
1,305,096.
Patented May 27, 1919.
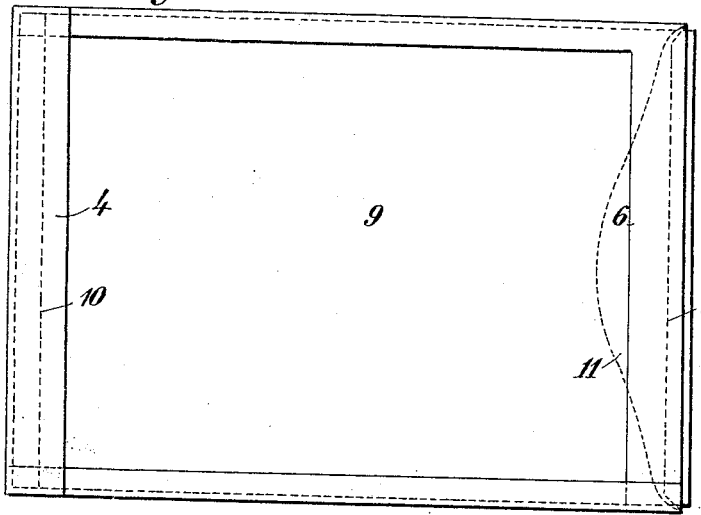
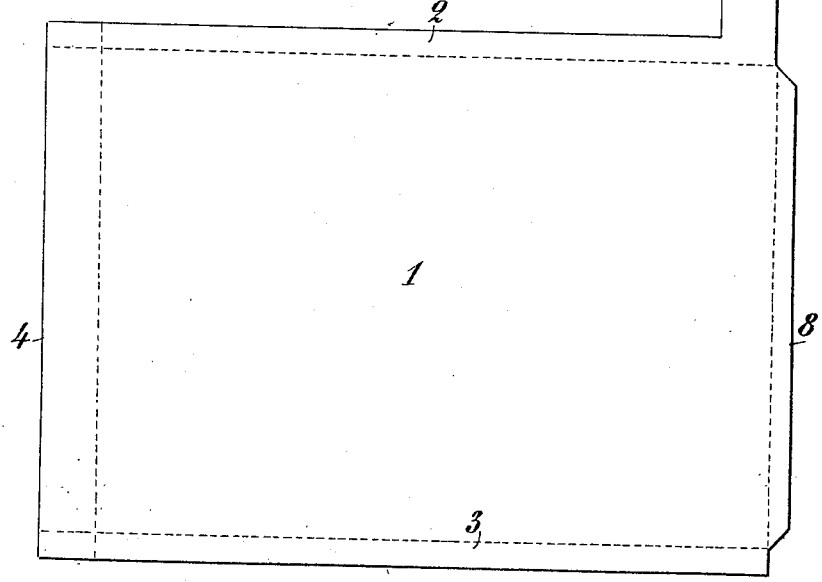
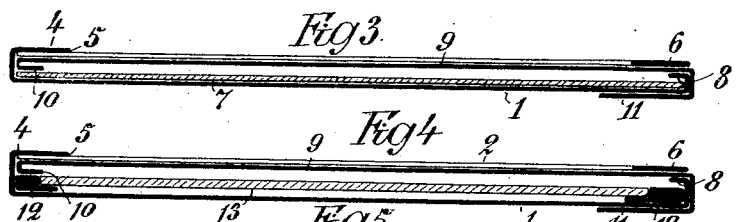
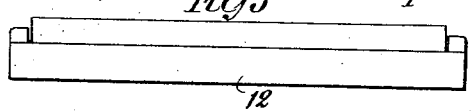
Inventor
Jens Peter Hansen
By Munn & Co.
Attorneys

UNITED STATES PATENT OFFICE.

JENS PETER HANSEN, OF COPENHAGEN, DENMARK.

PACKING OF PHOTOGRAPHIC RAW FILMS.

1,305,096. Specification of Letters Patent. Patented May 27, 1919.

Application filed December 10, 1918. Serial No. 266,170.

*To all whom it may concern:*

Be it known that I, JENS PETER HANSEN, a subject of the King of Denmark, and resident of Copenhagen, 10 Jacobys Alle, Denmark, have invented certain new and useful Improvements in Packing of Photographic Raw Films, of which the following is a specification.

The main object of my invention, which relates to packing of photographic raw-films, is to combine the special advantages of the well known roll-film-packing viz.: the ability of inserting the film by daylight in the developing apparatus with the advantage, which the well known form of packing, "film-packs," (a pack of film-sheets) presents in proportion to roll-film, viz.: to allow the use of ground glass in the camera, and besides to combine this with the advantages which every single-enveloping of films, known up to now, presents in proportion to the two aforesaid, viz.: that ordinary orthochromatic films may be used at pleasure, that the packing may be sold singly and is easier transportable, that development may be undertaken at any time without it being necessary to await the taking of the remaining films or to undertake unintended exposure takings on these, only in order to be able to commence the developing, and finally, that the films may at pleasure be developed singly (likewise as by pack-films, but in contrast to roll-films) so that they may be given different treatment in order to adjust exposure errors.

Further the invention aims at avoiding the use of adapter (a special holder or small case for the envelop), which is as a rule used by pack-films and most of the single-packings, as it may be used with such one, but is especially intended to be placed in cameras with a back frame of special form (hinged and with springy ground-glass-frame, but may be used with any type, magazine cameras excepted. It should however, be noted that removable ground glass may also be used, however, ground-glass is of course not absolutely necessary. Besides the combination of all the advantages aforementioned, the envelop in question possesses for one thing further the following superiorities. It is easy to manufacture, cheap, absolutely opaque, and secures the film so that the film lies plainly and smoothly during the exposing, and that it may be bent, and, for example, be carried in the pocket in a pocket-book without suffering damage. This is for example not the case with the single envelops, which are provided with tin plate edges, as these are liable to be cracked or bent. Tin plate edges also present the inconvenience, that if the cardboard of the envelop stretches under influence of damp air, the tinned edges do not follow, by which the cardboard and with it the film winds.

Finally should be mentioned, that the packing in question is considerably easier to insert and take out of the camera than both roll and pack-films, as also, that by the use of this packing owing to the fact, that it may be sealed—the danger of exposing the same film twice is avoided. Such double exposure often happens by roll-films, when it is forgotten to turn an unexposed part of film forward before the exposing. Likewise the danger of parts of the film remaining unexposed or exposed twice, for example, when a too long or too short piece of film is rolled up on the receiving bobbin, is avoided.

Besides the packing, like all other film-packing may, of course, be inserted and taken out of the camera by full daylight, and it may—by a slight modification—also be used for plates, which may then be bought ready packed in the same manner as films. The developing, fixing and also the washing takes place in a developing apparatus, specially constructed for the packing.

The invention is shown on the drawing, where Figure 1 shows the back plate of the packing in unfolded state with dotted bending lines, Fig. 2 shows a front view of the packing, Fig. 3 is a longitudinal section, Fig. 4 shows modified forms of execution with inlaid strip carriers for the use of glass plates, and Fig. 5 shows a form of execution of an inlaid strip carrier shown in Fig. 4 seen from above.

The packing consists of a back plate 1, of opaque thick paper or the like, the form and size of which will as a rule depend on the size of films current, with a holding ribbon 6 and a cover plate 9; and two long edges 2 and 3 of the back plate are bent, and the one short edge 4 is then bent (these bendings may be fastened to each other), so that a somewhat projecting edge 5 arises, and along the opposite short edge of the back plate 1 the two bent edges 2 and 3 are connected by a pasted ribbon 6. Whereby an envelop is formed, which may take up the film-sheet 7, which is kept in its place by the bendings 2, 3, and 4, the ribbon 6 and a bending 8 of the short edge of the back plate, which bending is applied under the ribbon.

Between the film 7 and the three bendings 2, 3 and 4 and the ribbon 6 the carton cover-plate may be inserted. This consists of a plate of thick paper or the like of nearly the same breadth as the film, its one short edge has a bending 10, which when the cover plate is drawn out, will coöperate with the opposite bending 8 on the back plate, and prevent the cover plate from being drawn perfectly out, likewise that opaqueness and lighttightness during the exposure is thereby secured.

The opposite short end of the cover-plate has a hasp or tongue 11, which, when the cover-plate is pulled down and has closed for the film, may be bent down over the back side of the back plate—in order to attain lighttightness—and be sealed there, besides it serves as a fingerhold during the displacement of the cover plate.

When a taking is to be made, and the lens is adjusted, the closed film-envelop is inserted into the camera, which may, for example, be done thereby, that the back-frame of the camera is hinged, and the ground-glass applied in springing manner, so that the envelop may be introduced after the back frame having been clapped back (after which the seal on the envelop is broken, the back frame is clapped to, and the cover plate 9 is drawn up and uncovers the film, which may now be exposed), or so that the envelop may be inserted in front of the ground-glass, while this is pressed back. In both cases the edges 5 will coöperate in the closed back-frame of the camera with a corresponding edge, which thereby keeps the envelop fast during the drawing up of the cover plate, so that the usual manipulations for this purpose are avoided.

When the taking has been finished, the cover plate is pulled back, so that the exposed film is covered light-tight, and the envelop is then taken out of the camera, whereupon, that the back frame is clapped back, so that the edge 5 gets free of the corresponding edge in the camera. The envelop may then be sealed again, but in a manner which differs from the former sealing.

The bendings 2 and 3 form a guide for the cover plate during its displacement, and owing to the bending 4 being placed above the bendings 2 and 3, it springs itself—together with the edge 5—somewhat away from the back plate 1, by which (when the camera is constructed in such a manner, that the bending 4 has plenty of room in it) it is attained, that the bending 10 without meeting resistance slides easily in under the bending 4, when the cover plate is pulled back after the exposing has been finished. To that contributes also the stiffness of the cover plate, which stiffness is obtained by the bending 10, this has besides also the task to remove dust from the surface of the film, in that it slides on over this, when the cover plate is drawn up.

The hasp or tongue 11 serves—besides for the purposes mentioned—by its tongued form also for the introduction of the envelop in the developing apparatus, and the ribbon 6 serves partly as a guide for the cover plate 9 during its displacement for covering and uncovering of the film 7, partly it contributes to secure, that the cover plate—when the envelop is manipulated outside the camera with broken seal—remains in its place, light-tight closing to the film, and finally it serves too—by means of its thickness and by the thickenings produced on the bendings 2 and 3 by the pasting—to secure, that the envelop remains in its place in the developing apparatus, when the cover-plate is drawn out in order to uncover the film for the developer.

The envelop here described may also be used for glass plates 13, in that two small strips 12 (Figs. 4 and 5) are then laid in into the envelop along two opposite sides of it in order to keep the glass plate in its place in relation to the light-opening, as the glass-plate 13 must always be somewhat smaller than the film size, intended for the same picture size.

It is obvious that it is not necessary to use one of the short sides for placing of the cover plate, as this, as well as the corresponding form of execution of the envelop may be arranged as occasion may require, likewise as the film of course need not to fill out the whole space in the envelop, but may be smaller, and surrounded by a frame, which fits within the said bendings, and besides the invention may be varied in different ways, without the principle of the invention being deviated from.

Having now described my invention, I desire to secure by Letters Patent:

1. Film envelop of thick paper or the like, with a back plate with catching edges and a slidable cover plate, characterized by a back plate 1 with four bent edges 2, 3, and 4, and 8 and a holding ribbon 6 or the like, all of paper or the like in connection with a cover plate 9 with bent edges 10, also of paper, which by the drawing out of the cover plate coöperates with the bending 8, and which has also a bent edge 11.

2. Film envelop according to claim 1, thereby characterized, that the bending 4 is placed on the outside of the lower ends of the bendings 2 and 3, which are also bent like 4, and has a projecting edge 5, which is springy, and which is intended to coöperate with corresponding hooks in the back frame of the camera during the drawing out of the cover plate 9, so that the envelop cannot follow, while the bending 4, by sitting outside on the bendings 2 and 3 as well as by the springing, is raised somewhat from the back plate 1, so that the edge 5 does not form any hindrance for the pulling in of the cover plate, free room in the camera for the edge 5 supposed.

In testimony whereof I affix my signature in presence of two witnesses.

JENS PETER HANSEN.

Witnesses:
   E. STECKHAHN,
   E. THORKELIN.

Copies of this patent may be obtained for five cents each, by addressing the "Commissioner of Patents, Washington, D. C."